US008838084B2

(12) United States Patent
Madej et al.

(10) Patent No.: US 8,838,084 B2
(45) Date of Patent: Sep. 16, 2014

(54) SYSTEM AND METHOD FOR PROVISIONING MOBILE COMMUNICATION DEVICE UPGRADES

(75) Inventors: Piotr Madej, Mississauga (CA); Simon Howard, Toronto (CA); Snezana Visnjic-Obucina, Toronto (CA); Levente Janosi, Dundas (CA); Thomas Parry, Cambridge (CA)

(73) Assignee: BlackBerry Limited, Waterloo (CA)

( * ) Notice: Subject to any disclaimer, the term of this patent is extended or adjusted under 35 U.S.C. 154(b) by 909 days.

(21) Appl. No.: 12/395,491

(22) Filed: Feb. 27, 2009

(65) Prior Publication Data
US 2010/0222048 A1 Sep. 2, 2010

(51) Int. Cl.
H04M 3/00 (2006.01)
G06F 9/445 (2006.01)
H04L 29/08 (2006.01)
H04L 12/24 (2006.01)
H04W 8/24 (2009.01)

(52) U.S. Cl.
CPC ............ *H04L 41/0273* (2013.01); *H04L 67/34* (2013.01); *G06F 8/65* (2013.01); *H04L 41/22* (2013.01); *H04L 41/0863* (2013.01); *H04L 41/082* (2013.01); *H04W 8/245* (2013.01)
USPC .......... 455/418; 455/419; 455/420; 717/170; 717/172; 717/176; 717/178

(58) Field of Classification Search
CPC .......................... H04W 8/245; H04M 1/72525
USPC ............... 455/418–420, 414.1; 717/168–178
See application file for complete search history.

(56) References Cited

U.S. PATENT DOCUMENTS

| 7,017,155 | B2 * | 3/2006 | Peev et al. ................... 717/176 |
| 7,802,246 | B1 * | 9/2010 | Kennedy et al. ............. 717/173 |
| 7,984,485 | B1 * | 7/2011 | Rao et al. .......................... 726/3 |
| 2002/0131404 | A1 * | 9/2002 | Mehta et al. .................. 370/352 |
| 2004/0254978 | A1 | 12/2004 | Ibanez et al. |
| 2005/0202808 | A1 * | 9/2005 | Fishman et al. ............. 455/419 |
| 2007/0093243 | A1 * | 4/2007 | Kapadekar et al. .......... 455/419 |
| 2007/0169073 | A1 * | 7/2007 | O'Neill et al. ............... 717/168 |
| 2008/0281956 | A1 | 11/2008 | Madej |
| 2009/0319848 | A1 * | 12/2009 | Thaper ......................... 714/748 |

* cited by examiner

*Primary Examiner* — Jinsong Hu
*Assistant Examiner* — Dung Hong
(74) *Attorney, Agent, or Firm* — Perry + Currier Inc.

(57) ABSTRACT

There is disclosed a system and method for provisioning mobile communication device upgrades. In an embodiment, the method comprises: providing an automated web service device management interface ("WSDMI") accessible to one or more carriers; adapting a supplier provisioning system to receive via the WSDMI one or more upgrade requests from the one or more carriers; adapting the supplier provisioning system to respond via the WSDMI to the one or more upgrade requests from the one or more carriers; and adapting the supplier provisioning system to execute one or more device upgrades on one or more supplier provisioning system connected devices. In an embodiment, the receiving and responding via the WSDMI is based on SOAP encoded XML messages.

18 Claims, 5 Drawing Sheets

SYSTEM AND METHOD FOR PROVISIONING MOBILE COMMUNICATION DEVICE UPGRADES

The present invention relates generally to a system and method for provisioning mobile communication device upgrades.

BACKGROUND

Suppliers of mobile communication devices may provide a provisioning system for configuration and management services for such devices. The operations to manage individual devices or groups of devices may occur over-the-air (OTA) via public land mobile networks (PLMN), WiFi™ or terrestrial connections using the Internet or other public or private packet-switched networks. However, the protocols used to access the devices for provisioning and management purposes may be supplier proprietary and therefore may not be easily integrated into network management systems that are available in the market place.

DETAILED DESCRIPTION

As noted above, the present invention relates to a system and method for provisioning mobile communication device upgrades on a carrier network. Carrier networks may wish to access the provisioning and management systems offered by a supplier in order to manage devices issued by them, but may not want to bear the cost of integrating the suite of supplier proprietary protocols into their existing network management systems. What is needed is an improved system and method for providing such third parties with access to supplier proprietary provisioning and management systems.

Figure 1:
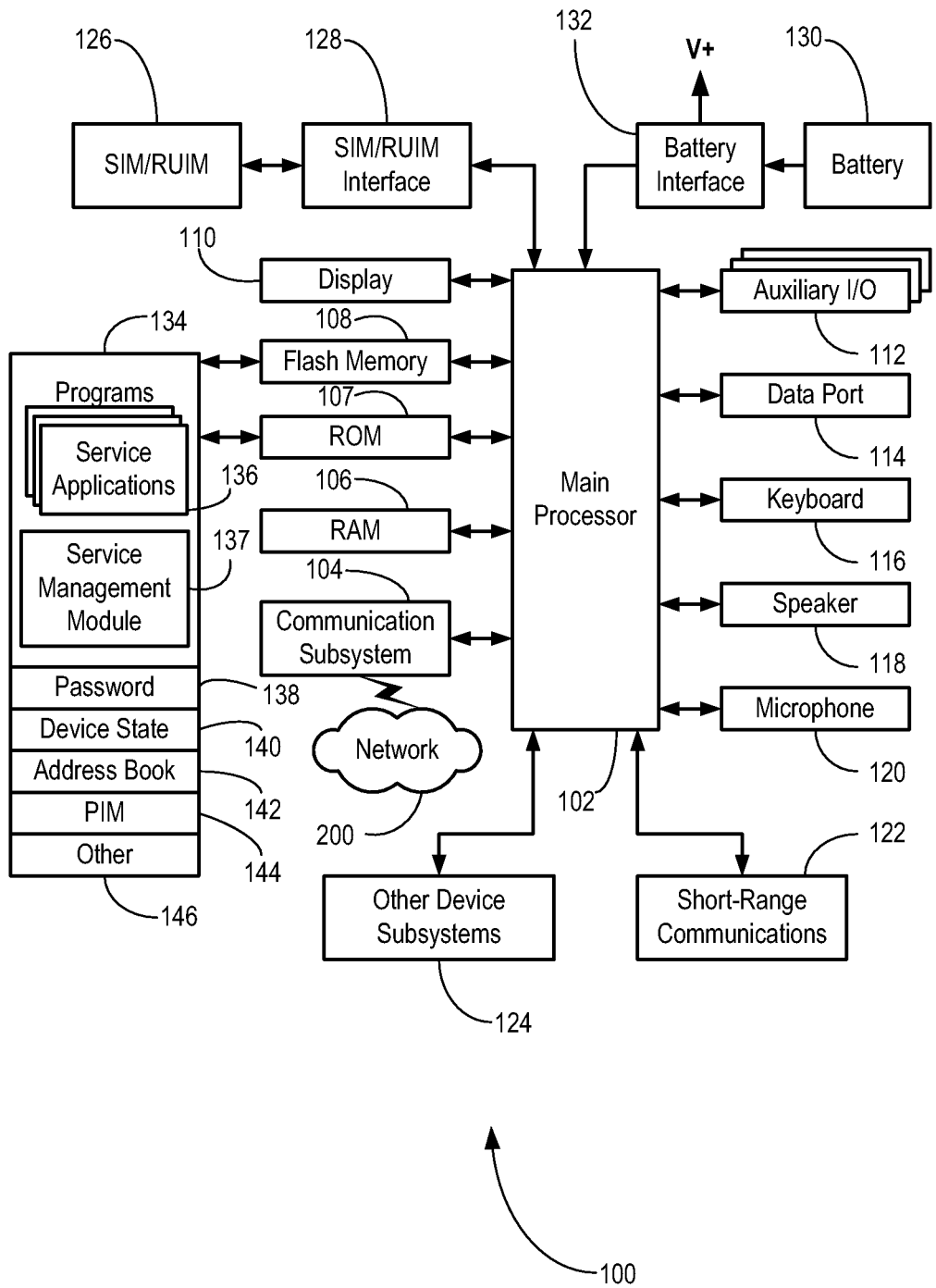
FIG. 1 is an illustration of a mobile handheld device in accordance with an embodiment.

Shown in FIG. 1 is a schematic block diagram of an illustrative mobile communication device 100. Device 100 may comprise a number of components, including a main processor 102 which controls the overall operation of device 100. Various communication functions, including data and voice communications, Internet browsing, instant text messaging, etc. may be performed through a communication subsystem 104 via wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The device 100 may be a battery-powered device and may include a battery interface 132 for receiving one or more rechargeable batteries 130 and for powering the various subsystems described above.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

Device 100 may also include a read-only memory (ROM) 107 that may store a non-alterable electronic serial number or ESN which may be burned into ROM 107 at the time of manufacture of device 100. In addition, device 100 may have a unique product identification number (PIN) stored in the ROM 107, or in another memory store in device 100.

The main processor 102, in addition to its operating system functions, enables execution of software applications 134 on the device 100. The software applications 134 may control various device features and services, and may be installed on the device 100 during its manufacture, or may be subsequently loaded onto the device 100 as a software update through one of the wireless network 200, the auxiliary I/O subsystem 112, the data port 114, the short-range communications subsystem 122, or another subsystem 124.

The software applications 134 may include, for example, various communication service modules 136 (e.g. email, instant text messaging, Internet browsing, music downloading, etc.), and a password approval module 138. The software applications 134 may also include a device upgrade module 137 for managing device upgrades, as will be described in more detail further below.

The handheld device 100 may also include a carrier network access module 139 that may be suitably adapted to manage access to a carrier network for the handheld device 100. The handheld device 100 may further include a device state module 140, an address book 142, a personal information manager (PIM) 144, and various other modules 146.

Figure 2:
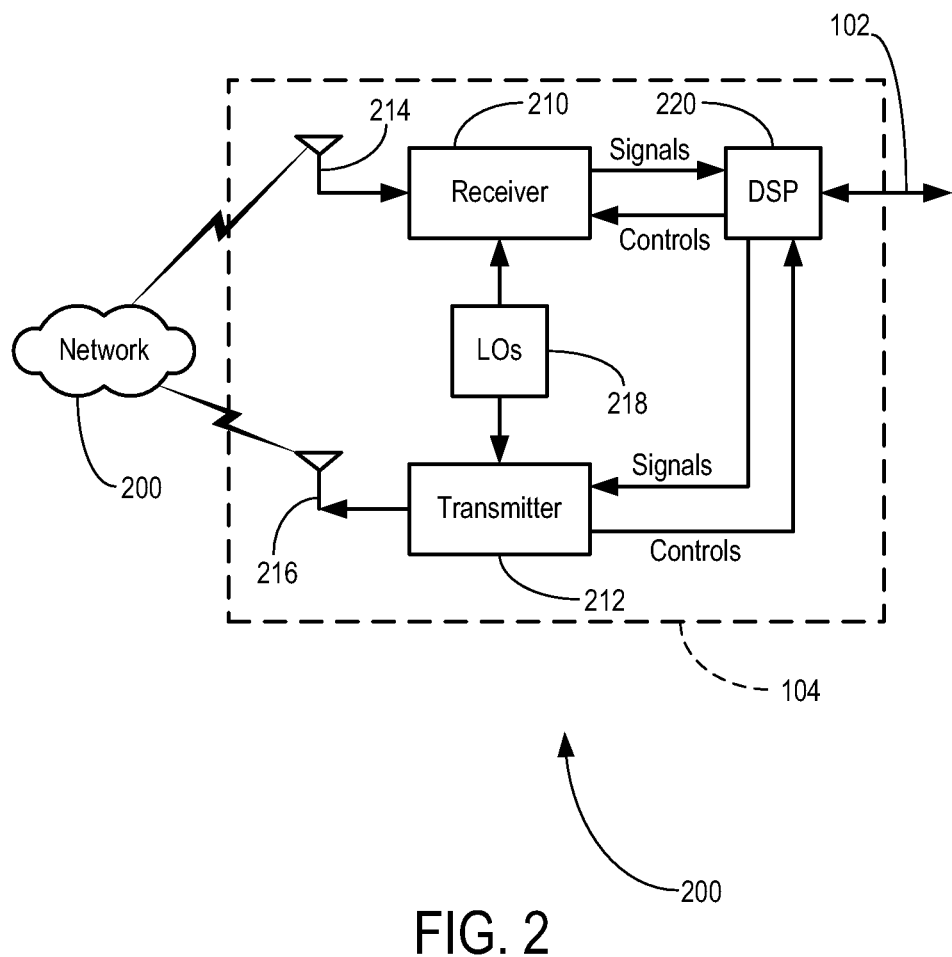
FIG. 2 is a schematic diagram of a communication subsystem component in the device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216.

Figure 3:
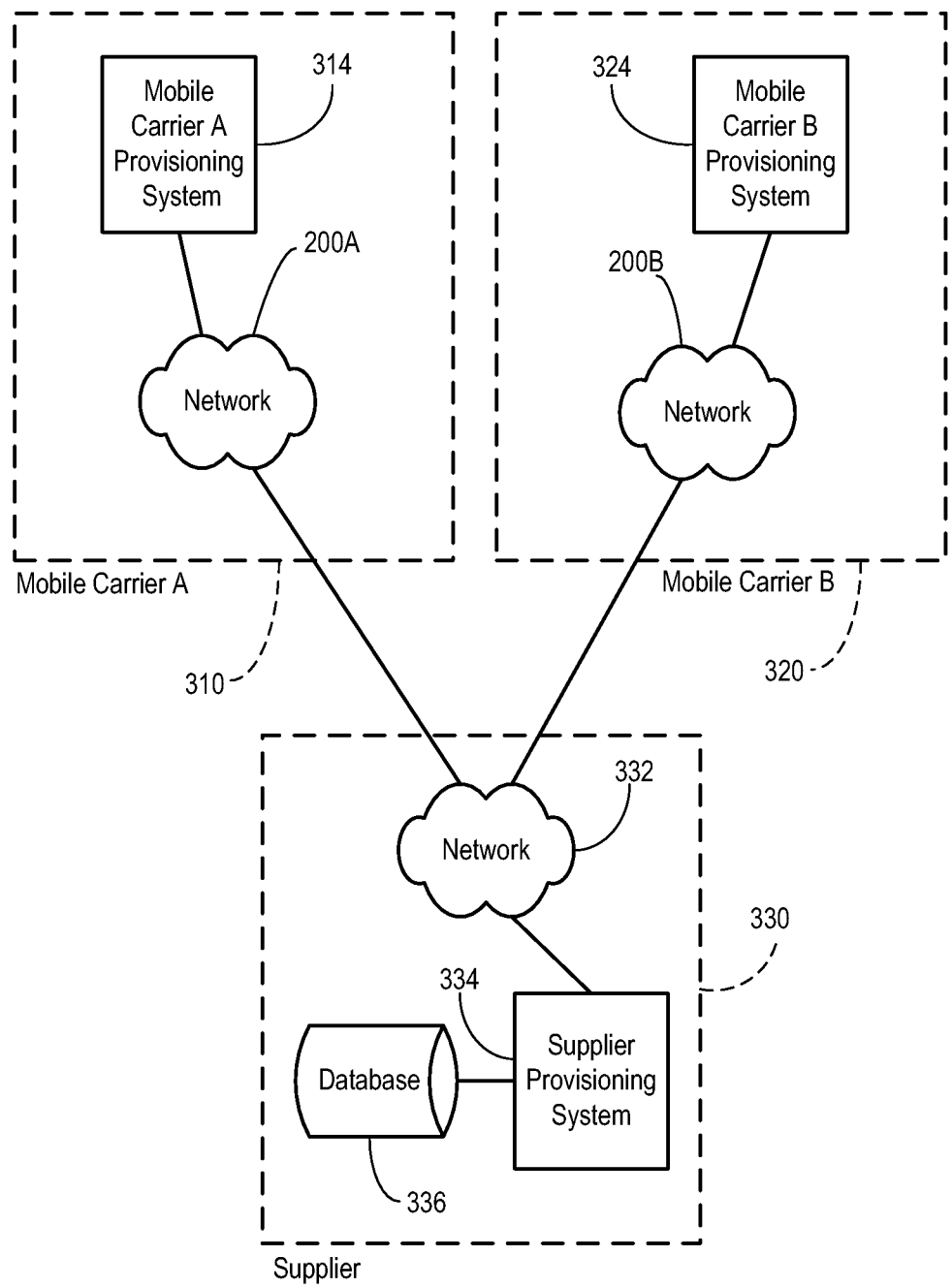
FIG. 3 is a schematic diagram of illustrative wireless carriers connected to a supplier via networks.

Now referring to FIG. 3, shown is an illustrative schematic block diagram of wireless networks 200A, 200B of mobile carrier A 310 and mobile carrier B 320, respectively. With the various components and subsystems described above, device 100 may be configured to access various services available through wireless networks 200A and 200B. As shown, each of the wireless networks 200A, 200B may have subsystems 314, 324 for registering and provisioning various wireless services for devices 100 on their respective wireless networks 310, 320. The supplier 330 may offer various communication services via network connections to the supplier 330's own network 332. The communication services may include, for example, wireless email, voice communication, instant text messaging, Internet browsing, music downloading, and various other services to subscribers on wireless networks 200A, 200B.

The supplier 330's network 332 may connect to a supplier provisioning system 334 maintained by the supplier 330 and which may be appropriately configured to interact with carrier provisioning subsystems 314, 324 provided on each of the wireless networks 200A, 200B. If connected through the Internet, for example, the connections between supplier provisioning system 334 and carrier provisioning subsystems 314, 324 may be by way of XML, or a web services interface. With a suitable network connection, carrier provisioning subsystems 314 and 324 may be configured to interact with the supplier 330's provisioning system 334 to request activation, deactivation, suspension or modification of a subscriber's services on their respective wireless networks 200A, 200B.

Supplier provisioning system 334 may maintain a database 336 of services that have been provisioned for each of the devices 100 on the wireless networks 200A, 200B of mobile carrier A 310, and mobile carrier B 320. In the database 336 of supplier provisioning system 334, each of the devices 100 may be uniquely identified, for example, by the unique ESN burned into the ROM 107 of each device 100. Alternatively, each device 100 may be uniquely identified by the unique PIN identifier stored in ROM 107, or in another memory store in device 100. Records in database 336 may contain the unique ESN or PIN retrieved from ROM 107 or another memory store on each device 100. Each device 100 may thus be uniquely recognized by the supplier provisioning system 334. Records in database 336 may also store information for the owning mobile carrier (e.g. mobile carrier A 310, or mobile carrier B 320), and this information may be linked to the unique ESN or PIN of device 100. There may be other ways to uniquely identify device 100 to supplier provisioning system 334, as will be described further below.

In an embodiment, each device 100 may include a carrier network access module 139 (FIG. 1) which is adapted to store various device properties or parameters, such as device type, device operating system ("OS") version, and a device application version. Furthermore, the carrier network access module 139 may store a value indicating the carrier to which the device 100 is linked or assigned.

In an embodiment, each of mobile carrier A 310 and mobile carrier B 320 may wish to have access to the supplier 330's provisioning system 334 to be able to manage each of the devices 100 provisioned on their respective wireless networks 200A, 200B. As mentioned earlier, the supplier provisioning system 334 may be configured to manage individual devices 100 or groups of devices 100 over-the-air via public land mobile networks (PLMN), WiFi or terrestrial connections using the Internet or other public or private packet-switched networks. However, the supplier protocols used to access the devices 100 for provisioning and management purposes may be proprietary, and therefore may not be easily integrated into network management systems that are available in the market place. While mobile carrier A 310 and mobile carrier B 320 may wish to access the provisioning and management systems offered by the supplier, they may not wish to bear the cost of integrating the suite of supplier proprietary protocols into their existing network management systems.

To resolve this problem, the present disclosure describes a system and method which uses an automated web service interface to provide a common interface for device management for all carriers, allowing them to have access to at least some features of the supplier's provisioning system regardless of the carrier's particular disparate systems and protocols. This web service interface may provide a graphical user interface (GUI) for ease of use. In an embodiment, industry standard Extensible Markup Language (XML) and Simple Object Access Protocol (SOAP) are used to define the syntax and semantics of commands that may be executed on the supplier provisioning system 334 via this automated web service interface. For the purposes of the present discussion, this automated web service interface for device management will be generally referred to as the "web service device management interface" or "WSDMI".

In an embodiment, this WSDMI is configured to mimic the abilities of a supplier provisioning server graphical user interface (GUI) such that third parties (such as mobile carrier A 310 and mobile carrier B 320) are provided access to at least some of the provisioning and management functions accessible to the supplier 330 via a standardized interface technique defined in XML and SOAP. In an embodiment, all transactions completed over WSDMI may be synchronous, and submitted as HTTPS-encoded SOAP messages originating from a carrier provisioning system. However, for the purposes of the present disclosure, the "request" and "response" will be described from the perspective of the supplier provisioning system, as it is the common resource being accessed by one or more carriers via the WSDMI. Thus, a request initiated by a carrier is "received" by the supplier provisioning system, and the supplier provisioning system then "responds" to the request. This will be described in more detail further below in an illustrative example.

By providing a web-based interface, using standard protocols such as HTTPS/TCP/IP, the WSDMI may be easily accessed by carriers for managing devices deployed on their networks. In other words, the WSDMI may be viewed as a user interface access to the "back end" provisioning and management functions offered on a server on the supplier provisioning system 334.

By providing a commonly accessible third party interface that may be accessed using standardized interface techniques (e.g. XML and SOAP), the set of functions available on the supplier provisioning system 334 may be easily updated by the supplier and made accessible to third parties such as carriers. In addition, various alternative functions may be made available via the WSDMI such that third parties may select the functions that they wish to use for provisioning and managing their devices.

In an embodiment, such alternative functions made available via WSDMI may be accessible using a wildcard parameter setting. For example, the use of a wildcard parameter setting such as that found in a SOAP command may trigger the supplier provisioning system 334 to execute logic to resolve the wildcard setting, and in doing so may present to the third party the best available choice or outcome for the desired command the third party wishes to execute. This offloads from the third party the need to track and manage many aspects of the devices 100 deployed on their respective networks, and instead the third parties may exploit ease of use of the WSDMI to make the best provisioning and management choices on their behalf, and possibly to reduce staffing requirements as well.

As an illustrative example, the present invention makes it possible for a SOAP command to be created that allows a third party (e.g. mobile carrier A 310 and mobile carrier B 320) to request all devices 100 on their respective networks of a certain device model type which must be upgraded to the latest revision of their operating system software. Instead of having to specify the specific software revision numbers for each device model, the SOAP command is may be non-specific by including a wildcard, leaving it to the supplier provisioning system 334 to select the most appropriate software revision for a particular device model, on the third party's particular network. Thus, the burden of selecting the best software revision number for a particular device model on a particular network is left for the supplier 330 to manage.

In an embodiment, upon use of a wildcard command as described above by a third party, the supplier provisioning system 334 may return a reference number with the details of which software revision has been selected as the best software revision for the particular device model and network. Using the reference number, the third party can then decide to initiate the software revision upgrade, defer the upgrade, or resubmit the command request with a variant parameter. Thus, the WSDMI with the SOAP wildcard options may provide a type of database lookup function relating to the latest available software updates for various devices 100, as a result of the function to upgrade device software. With this side-effect, the third party carrier does not have to manage its devices by keeping track of the software revisions, new device models or model variants, or network access methods. As well, a variety of other functions which would normally be part of the options that would have to be considered before upgrading software on a device 100 is no longer necessary, making provisioning and management significantly easier for third parties.

In an embodiment, the WSDMI may become more than just a mechanism to execute functions on a remote server, as the WSDMI extends the functions and logic available in the supplier provisioning system 334 to third parties and bundles with the WSDMI access to those functions into simplified commands.

In another embodiment, the WSDMI may also allow the supplier provisioning system 334 to act as a gateway between each third party carrier and the devices 100 themselves, where each third party does not have to interact directly with the devices it owns, but instead uses the supplier provisioning system 334 and the WSDMI to manage those devices. This also removes the need for the third party carrier to know what connectivity mechanism is available to a specific device.

In an embodiment, when deciding to upgrade a device, the size of the software update and the speed and cost of bandwidth necessary for the update may determine when and over what technology the upgrade would best be delivered. For example, some choices can include wide-area wireless networks such as GSM/GPRS/EDGE, CDMA/EVDO, WiFi, or wireline Internet via a desktop connection. The supplier provisioning system 334 can be configured to make these selections, based on the device capability, monitoring the device for a time when it is most accessible for an upgrade. This function would operate transparently to a third party's, but allows selection of the most efficient/cost effective method of upgrading devices.

In an illustrative embodiment, the functions exposed via the WSDMI may be grouped into a number of categories, such as:

(i) Search for available upgrades
(ii) Search for applicable devices based on selected upgrade.
(iii) Schedule upgrade
(iv) Monitor ongoing upgrade (upgrade status)
(v) Roll back an upgrade Each of the above transaction categories may represent a synchronous request/response architecture, which may be submitted as a single message sent over HTTPS-encoded request using SOAP protocol to encode XML data. A third party carrier may send this request message to the supplier provisioning system 334, and the supplier provisioning system 334 may process that request synchronously, creating a XML response which is sent back using SOAP protocol over HTTPS. The response from the supplier provisioning system 334 will either contain a result or a fault in XML which conforms to a predetermined web service definition language (WSDL) schema.

Figure 4:
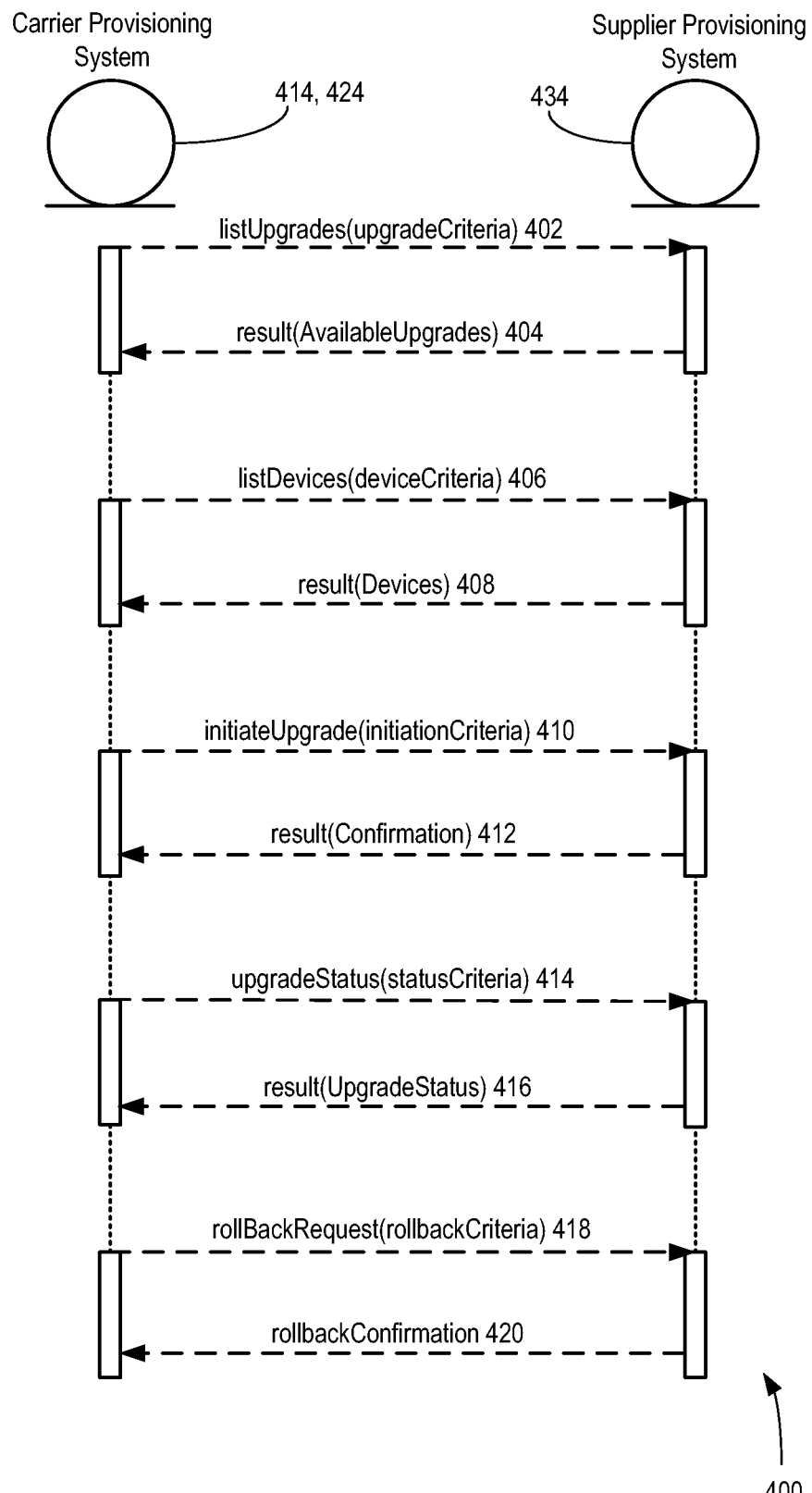
FIG. 4 is a schematic diagram of illustrative requests and responses between a wireless carrier and a supplier provisioning system through an automated web service device management interface.

Now referring to FIG. 4, to illustrate the above described functions, a detailed illustrative example will now be described. As shown in FIG. 4, schematic diagram 400 represents requests and responses between a carrier provisioning system 414, 424 and a supplier provisioning system 434 in order to perform various functions, such as listing available upgrades, listing devices, scheduling upgrade initiations, checking upgrade status, and rolling back an upgrade to revert back to previous versions. In an embodiment, the data transmission protocols used to communicate between carrier provisioning system 414, 424 and supplier provisioning system 434 may be based on industry standards, such as SOAP/1.1, HTTP (W3C 1.1 compliant), SSL, TCP/IP. As well, the data language may be an industry standard, such as XML (W3C 1.0 compliant)). SOAP encoding guidelines may comply with predefined web services description language (WSDL) schema, which may be case sensitive. XML encoding guidelines may be based on Extensible Markup Language (XML) 1.0 (Second Edition) with W3C Recommendations.

As an illustrative example, a request 402 to list available upgrades may be made in the form of a SOAP request that a third party carrier provisioning system 414, 424 submits to the supplier provisioning system 434. As an illustrative example, the request 402 may contain a SOAP encoded XML message of the following general format:

```
<upgradeCriteria xmlns:xsi="http://www.w3.org/2001/XMLSchema-
instance"
 xmlns:soapenc="http://schemas.xmlsoap.org/soap/encoding/"
 xmlns:xsd="http://www.w3.org/2001/XMLSchema"
 xmlns:n1="java:provision.otasl.webservice.imp.model"
 xsi:type="n1:UpgradeCriteria">
 <header xsi:type="n1:Header">
  <requestNumber xsi:type="xsd:long"></requestNumber>
  <user xsi:type="n1:User">
   <login></login>
   <password></password>
  </user>
 </header>
 <deviceModel></deviceModel>
 <deviceProperty xsi:type="n1:DeviceProperty">
  <devicePIN></devicePIN>
  <esn></esn>
  <imei></imei>
  <imsi></imsi>
  <meid></meid>
  <msisdn></msisdn>
 </deviceProperty>
</upgradeCriteria>
```

In the above illustrative SOAP encoded XML message, upgradeCriteria is the root tag for making upgrade requests, and deviceModel is the element name used for specifying the device model to be updated. If no value is specified for deviceModel, the search may consist of all models.

In this example, deviceProperty—is the element name for the device properties used for the search, including devicePIN—the device PIN, esn—electronic serial number (ESN), imei—International Mobile Equipment Identifier (IMEI), imsi International Mobile Subscriber Identifier (IMSI), meid—Mobile Equipment Identity (MEID), and msisdn—Mobile Station International Subscriber Directory Number. In order to authenticate the user, login and password may be used. Finally, requestNumber is a unique request number for identifying this request.

Continuing with this illustrative example, the supplier provisioning system 434 may respond at 404 with a SOAP encoded XML message having the following general format:

```
<result xmlns:n1="java:provision.otasl.webservice.imp.model"
   xsi:type="n1:AvailableUpgrades">
   <upgradeDescription soapenc:arrayType=
"n1:UpgradeDescription[N]"> ]"> the UpgradeDescription
element will be repeated N times
   <UpgradeDescription xsi:type="n1:UpgradeDescription">
      <applicableDeviceModels>
         <n2:ArrayOfDeviceModel xmlns:n2="java:provision.otasl.-
webservice.imp.model"
            soapenc:arrayType="n2:DeviceModel[M]"> the DeviceModel
            element will be repeated M times
            <DeviceModel    xsi:type="n2:DeviceModel">
            <deviceModel    xsi:type="xsd:string"></deviceModel>
            </DeviceModel>
            ...
            <DeviceModel    xsi:type="n2:DeviceModel">
            <deviceModel    xsi:type="xsd:string"></deviceModel>
            </DeviceModel>
         </n2:ArrayOfDeviceModel>
      </applicableDeviceModels>
      <currentBuildVersion></currentBuildVersion>
      <currentPlatformVersion></currentPlatformVersion>
      <quickFix   xsi:type="xsd:boolean"></quickFix>
      <targetBuildVersion></targetBuildVersion>
      <targetPlatformVersion></targetPlatformVersion>
      <upgradeDescription></upgradeDescription>
      <upgradeNumber></upgradeNumber>
      <upgradeSize></upgradeSize>
   </UpgradeDescription>
   ...
   <UpgradeDescription xsi:type="n1:UpgradeDescription">
      <applicableDeviceModels>
         <n2:ArrayOfDeviceModel xmlns:n2="java:provision.otasl.-
webservice.imp.model"
            soapenc:arrayType="n2:DeviceModel[M]">
            <DeviceModel    xsi:type="n2:DeviceModel">
            <deviceModel    xsi:type="xsd:string"></deviceModel>
            </DeviceModel>
            ...
            <DeviceModel    xsi:type="n2:DeviceModel">
            <deviceModel    xsi:type="xsd:string"></deviceModel>
            </DeviceModel>
         </n2:ArrayOfDeviceModel>
      </applicableDeviceModels>
      <currentBuildVersion></currentBuildVersion>
      <currentPlatformVersion></currentPlatformVersion>
      <quickFix   xsi:type="xsd:boolean"></quickFix>
      <targetBuildVersion></targetBuildVersion>
      <targetPlatformVersion></targetPlatformVersion>
      <upgradeDescription></upgradeDescription>
      <upgradeNumber></upgradeNumber>
      <upgradeSize></upgradeSize>
   </UpgradeDescription>
```

The above response 404 includes an UpgradeDescription which contains information for a single "upgrade bundle" available for the criteria that have been sent in the request. This section may be repeated N number of times, where N is number of upgrade bundles matching the search criteria.

In the above example, applicableDeviceModels lists device models applicable for the Upgrade Bundle, and list any number of devices. Additional elements may include currentBuildVersion—which identifies the current build version of the device required to be eligible for the upgrade, currentPlatformVersion—which identifies the platform version the device has to have in order to be eligible for upgrade, quickFix—which identifies if the application is a "quick fix" to a problem, targetBuildVersion—which is the upgrade target build version, targetPlatformVersion—which is the target platform version, upgradeNumber—which is the upgrade number that uniquely identifies the upgrade, upgradeDescription—which is a description of the upgrade, and upgradeSize—which identifies the approximate size of the file that will be downloaded by device in order to do the upgrade.

The result of listing the upgrades will be a set of objects, each representing a single upgrade bundle. Some of the information included may be applicable device models, upgrade description, and software version numbers. A key piece of information that must be retained in the upgrade bundle number and upgrade number. Once an upgrade is selected, these numbers will be needed to further proceed with the process.

In another illustrative example, rather than requesting a search of available upgrades, the carrier provisioning system 414, 424 may request at 406 a search for applicable devices based on a selected upgrade. The SOAP request from the carrier provisioning system 414, 424 may contain an XML message of the following general format:

```
<deviceCriteria xmlns:xsi="http://www.w3.org/2001/XMLSchema-
instance"
   xmlns:soapenc="http://schemas.xmlsoap.org/soap/encoding/"
   xmlns:xsd="http://www.w3.org/2001/XMLSchema"
   xmlns:n1="java:provision.otasl.webservice.imp.model"
   xsi:type="n1:DeviceCriteria">
   <header xsi:type="n1:Header">
   <requestNumber></requestNumber>
   <user xsi:type="n1:User">
     <login></login>
     <password></password>
   </user>
   </header>
   <deviceModel></deviceModel>
   <deviceProperty xsi:type="n1:DeviceProperty">DeviceProperty section
will be repeated N times
    <devicePIN></devicePIN>
    <esn></esn>
    <imei></imei>
    <imsi></imsi>
    <meid></meid>
    <msisdn></msisdn>
   </deviceProperty>
   <maxDeviceRecords xsi:type="xsd:int"></maxDeviceRecords>
   <pageNumber xsi:type="xsd:int"></pageNumber>
   <upgradeNumber></upgradeNumber>
</deviceCriteria>
```

In the above example, deviceCriteria—is the root tag for the request, and other element names correspond to previously described element names. However, in addition, the following element names are defined: maxDeviceRecords—this number represents maximum number of devices that will be returned in the response, and may be lower or equal to a defined upper limit; pageNumber—this number represents the page of results when paging through the result set greater then maximum number of device records; and upgradeNumber—this is the upgrade number that has been returned in the upgrade search. Based on this search, only devices applicable for this upgrade will be returned.

The request 406 labelled as listDevices(deviceCriteria) may be an optional call that helps in determining which devices will be selected for upgrade. When listing devices, upgrade reference numbers will need to be supplied. As explained below, this call will return a list of device objects that are applicable to the selected upgrade. Other criteria that can be used to narrow down the device list are device and SIM properties (with possibility of specifying a mask in order to get a class of devices. For example, specifying phone numbers starting with 123* may return all devices with phone numbers in that area code for a particular carrier.

In this illustrative example, the supplier provisioning system 434 may respond at to the request 406 to list devices available for upgrade. As an example, a corresponding SOAP encoded XML message may have the following general format:

```
<result  xmlns:n1="java:provision.otasl.webservice.imp.model"
    xsi:type="n1:Devices">
    <deviceDescription  soapenc:arrayType=
"n1:DeviceDescription[N]">        DeviceDescription
will be repeated N times
    <DeviceDescription xsi:type="n1:DeviceDescription">
        <currentApplicationVersion></currentApplicationVersion>
        <currentPlatformVersion></currentPlatformVersion>
        <deviceModel></deviceModel>
        <deviceProperty   xsi:type="n1:DeviceProperty">
        <devicePIN></devicePIN>
        <esn></esn>
        <imei></imei>
        <imsi></imsi>
        <meid></meid>
        <msisdn></msisdn>
        </deviceProperty>
    </DeviceDescription>
    ...
    <DeviceDescription  xsi:type="n1:DeviceDescription">
        <currentApplicationVersion></currentApplicationVersion>
        <currentPlatformVersion></currentPlatformVersion>
        <deviceModel></deviceModel>
        <deviceProperty   xsi:type="n1:DeviceProperty">
        <devicePIN></devicePIN>
        <esn></esn>
        <imei></imei>
        <imsi></imsi>
        <meid></meid>
        <msisdn></msisdn>
        </deviceProperty>
    </DeviceDescription>
    <recordsReturned  xsi:type="xsd:int"></recordsReturned>
    <totalNumberOfRecords  xsi:type="xsd:int"></totalNumberOfRecords>
    <currentPageNumber xsi:type="xsd:int"><currentPageNumber>
</result>
```

The following table describes details on tag meanings and data expectations for the above request for the above response 408: recordsReturned—is the number of DeviceDescription items that has been returned in this response; totalNumberOfRecords—total number of DeviceDescription items available—If this number is bigger then records returned, the search criteria needs to be narrowed down; currentPageNumber—Indicates the page number of the result set.

In another illustrative example, the carrier provisioning system 414, 424 may request at 410 a scheduled upgrade. The SOAP request may contain an XML message of the following general format:

```
<initiationCriteria xmlns:xsi="http://www.w3.org/2001/XMLSchema-
instance"
  xmlns:soapenc="http://schemas.xmlsoap.org/soap/encoding/"
  xmlns:xsd="http://www.w3.org/2001/XMLSchema"
  xmlns:n1="java:provision.otasl.webservice.imp.model"
  xsi:type="n1:InitiationCriteria">
<header xsi:type="n1:Header">
  <requestNumber></requestNumber>
  <user xsi:type="n1:User">
  <login></login>
  <password></password>
  </user>
</header>
<deviceProperties soapenc:arrayType="n1:DeviceProperty[N]">
DeviceProperty section will be repeated N times
 <DeviceProperty  xsi:type="n1:DeviceProperty">
  <devicePIN></devicePIN>
  <esn></esn>
  <imei></imei>
  <imsi></imsi>
  <meid></meid>
  <msisdn></msisdn>
 </DeviceProperty>
</deviceProperties>
...
 <DeviceProperty xsi:type="n1:DeviceProperty">
  <devicePIN></devicePIN>
  <esn></esn>
  <imei></imei>
  <imsi></imsi>
  <meid></meid>
  <msisdn></msisdn>
 </DeviceProperty>
</deviceProperties>
<deviceType></deviceType>
<initiationPrameters xsi:type="n1:InitiationParameters">
 <downloadConnectins xsi:type="n1:DownloadConnections">
  <useWAN  xsi:type="xsd:boolean"></useWAN>
  <useWANIntRoaming  xsi:type="xsd:boolean">
  </useWANIntRoaming>
  <useWANRoaming  xsi:type="xsd:boolean"></useWANRoaming>
  <useWiFi  xsi:type="xsd:boolean"></useWiFi>
  <useWiFiGAN  xsi:type="xsd:boolean"></useWiFiGAN>
  <useWired  xsi:type="xsd:boolean"></useWired>
 </downloadConnectins>
 <rollbackCutOffDays></rollbackCutOffDays>
 <subscriberMessages soapenc:arrayType="n1:SubscriberMessage[M]">
SubscriberMessage section will be repeated M times
  <SubscriberMessage xsi:type="n1:SubscriberMessage">
   <languageCode></languageCode>
   <message></message>
  </SubscriberMessage>
 </subscriberMessages>
 <upgradeInitiationSchedule xsi:type="n1:UpgradeInitiationSchedule">
  <mondaySchedule  xsi:type="n1:SingleDaySchedule">
   <allDay  xsi:type="xsd:boolean"></allDay>
   <startHour></startHour>
   <endHour></endHour>
   <send  xsi:type="xsd:boolean"></send>
  </mondaySchedule>
  <tuesdaySchedule  xsi:type="n1:SingleDaySchedule">
   <allDay  xsi:type="xsd:boolean"></allDay>
   <startHour></startHour>
   <endHour></endHour>
   <send  xsi:type="xsd:boolean"></send>
  </tuesdaySchedule>
  <wednesdaySchedule  xsi:type="n1:SingleDaySchedule">
   <allDay  xsi:type="xsd:boolean"></allDay>
   <startHour></startHour>
   <endHour></endHour>
   <send  xsi:type="xsd:boolean"></send>
  </wednesdaySchedule>
  <thursdaySchedule  xsi:type="n1:SingleDaySchedule">
   <allDay  xsi:type="xsd:boolean"></allDay>
   <startHour></startHour>
   <endHour></endHour>
   <send  xsi:type="xsd:boolean"></send>
  </thursdaySchedule>
  <fridaySchedule  xsi:type="n1:SingleDaySchedule">
   <allDay  xsi:type="xsd:boolean"></allDay>
   <startHour></startHour>
   <endHour></endHour>
   <send  xsi:type="xsd:boolean"></send>
  </fridaySchedule>
  <saturdaySchedule  xsi:type="n1:SingleDaySchedule">
   <allDay  xsi:type="xsd:boolean"></allDay>
   <startHour></startHour>
   <endHour></endHour>
   <send  xsi:type="xsd:boolean"></send>
  </saturdaySchedule>
  <sundaySchedule  xsi:type="n1:SingleDaySchedule">
   <allDay  xsi:type="xsd:boolean"></allDay>
   <startHour></startHour>
   <endHour></endHour>
   <send  xsi:type="xsd:boolean"></send>
  </sundaySchedule>
  <maxInitiationsPerDay></maxInitiationsPerDay>
 </upgradeInitiationSchedule>
 <upgradeSeverity xsi:type="n1:UpgradeSeverity">
  <critical  xsi:type="xsd:boolean"></critical>
```

```
  <high xsi:type="xsd:boolean"></high>
  <low  xsi:type="xsd:boolean"></low>
  <medium  xsi:type="xsd:boolean"></medium>
 </upgradeSeverity>
</initiationPrameters>
<upgradeNumber></upgradeNumber>
</initiationCriteria>
```

The following element name definitions may be provided for the above request 410: initiationCriteria—is the root tag for the request; upgradeNumber—is the upgrade number that has been returned in the upgrade search and is required for upgrade initiation; initiationParameters—is a list of initiation parameters needed to create the upgrade; downloadConnections—is a list of download connections that can be used to download the patch to the device, and specifies whether the device should use a WAN connection (useWAN), a WAN connection while roaming internationally (useWANIntRoaming), a WAN connection while roaming (useWANRoaming), a Wi-Fi connection (useWiFi), a Wi-Fi GAN connection (useWiFiGAN), or a serial bypass connection (useWired).

In addition, the following element names may be defined for the above request 410: rollbackCutOffDays—Number of days that device should keep the backup of previous software version to allow rollback (e.g. minimum of 1, maximum of 31); subscriberMessages—contains set of Subscriber messages that will be sent to the subscriber when the upgrade is initiated; SubscriberMessage—Contains single subscriber message; languageCode—language code in which this message is written. All two letter ISO language codes will be accepted; message—message to be displayed to the user; upgradeInitiationSchedule—specifies the schedule for the upgrade initiation message to be sent to devices, where "xxxx" Schedule contains the schedule for a particular "xxxx" day of the week. Further more, if allDay is set to true, the initiation requests will be sent during the entire day. As well, startHour specifies the start hour for sending initiation requests, and endHour specifies the end hour for sending initiation requests. The element name send controls whether initiation requests will be sent on the specific day.

In an embodiment, upgradeSeverity—specifies upgrade severity, which is displayed during upgrade initiation on the device. The severity may be set, for example, to critical, high, medium, and low, allowing a user of device 100 to determine whether to upgrade immediately, or wait for a more convenient time.

The above request 410 schedules upgrade initiations, and in order to successfully schedule an upgrade process, the following should be supplied: upgrade reference numbers, device criteria that will uniquely identify the devices that will be upgraded, upgrade schedule, severity, throttling parameters, and download methods.

In this illustrative example, the response 412 from the supplier provisioning system 434 may be a SOAP encoded XML message of the following general format. The confirmation message may include a unique reference number that can be used later on to get a status of an upgrade.

```
<result>
    <statusCode></statusCode>
    <statusDescription></statusDescription>
    <upgradeInitiationNumber></upgradeInitiationNumber>
</result>
```

Here, statusCode—returns a status code for the initiation, where a pre-selected numeral may indicate a success. Any other numeral may indicate an error or warning. As well, statusDescription—may provide a description of the status (e.g. success or error description), upgradeInitiationNumber—Upgrade initiation number. This number is a reference number used to access status information of the ongoing upgrades.

In another illustrative example, the carrier provisioning system 414, 424 may request at 414 a status update on an ongoing upgrade. The reference number that was previously returned from the initiation should be provided. Also, if detailed information for device status is to be provided, criteria for the devices in question must also be provided. The SOAP request that a third party carrier will submit may contain an XML message of the following general format:

```
<statusCriteria xmlns:xsi="http://www.w3.org/2001/XMLSchema-
    instance"
  xmlns:soapenc="http://schemas.xmlsoap.org/soap/encoding/"
  xmlns:xsd="http://www.w3.org/2001/XMLSchema"
  xmlns:n1="java:provision.otasl.webservice.imp.model"
  xsi:type="n1:StatusCriteria">
  <allDevices xsi:type="xsd:boolean"></allDevices>
  <deviceProperties soapenc:arrayType="n1:DeviceProperty[N]">
  DevieProperty is repeated N times
    <DeviceProperty xsi:type="n1:DeviceProperty">
      <devicePIN></devicePIN>
      <esn></esn>
      <imei></imei>
      <imsi></imsi>
      <meid></meid>
      <msisdn></msisdn>
    </DeviceProperty>
  </deviceProperties>
  <header xsi:type="n1:Header">
    <requestNumber></requestNumber>
    <user  xsi:type="n1:User">
      <login></login>
      <password></password>
    </user>
  </header>
  <maxDetailedRecords xsi:type="xsd:int"></maxDetailedRecords>
  <pageNumber xsi:type="xsd:int"><pageNumber>
  <upgradeNumber></upgradeNumber>
</statusCriteria>
```

For above request 414, upgradeCriteria—indicates if device upgrades statuses should be shown or is summary only needed. Upgrades can be initiated for thousands of devices at a time. If this flag is set to true, detailed status information for every single device will be returned. As well, upgradeInitiationNumber—is the reference number that was returned when upgrade was scheduled; and pageNumber—indicates the page number of the result set that the carrier requests.

In this illustrative example, the supplier provisioning system 434 may respond at 416 with a SOAP encoded XML message in the following general format. Generally speaking, the status information may include: date of original update request, count of devices in each state (completed, failed, pending etc.), target software versions, initiator information, and if requested, detailed information about the upgrade of every single device included in the upgrade initiation request. As described below, some of the information for devices are: percentage completed, current detailed status information, and error information, etc.

```
<result xmlns:n1="java:provision.otasl.webservice.imp.model"
  xsi:type="n1:UpgradeStatus">
  <countFailed  xsi:type="xsd:int"></countFailed>
```

-continued

```
<countInProgress xsi:type="xsd:int"></countInProgress>
<countInitiated xsi:type="xsd:int"></countInitiated>
<countPending xsi:type="xsd:int"></countPending>
<countRejected xsi:type="xsd:int"></countRejected>
<countRolledBack xsi:type="xsd:int"></countRolledBack>
<countSuccessfullyCompleted xsi:type="xsd:int">
</countSuccessfullyCompleted>
<deviceStatus soapenc:arrayType="n1:DeviceUpgradeStatus[N]">
DeviceUpgradeStatus will be repeated N times
    <DeviceUpgradeStatus xsi:type="n1:DeviceUpgradeStatus">
    <deviceModel></deviceModel>
    <devicePIN></devicePIN>
    <finalApplicationVersion></finalApplicationVersion>
    <finalOSVersion></finalOSVersion>
    <lastStatusDate xsi:type="xsd:dateTime">2008-03-
    13T10:05:43.686-04:00</lastStatusDate>
    <message></message>
    <progress></progress>
    <requestType></requestType>
    <status></status>
    <statusDetails></statusDetails>
    <upgradeStatDate xsi:type="xsd:dateTime">2008-03-
13T10:05:43.686-04:00</upgradeStatDate>
  </DeviceUpgradeStatus>
  ...
<DeviceUpgradeStatus xsi:type="n1:DeviceUpgradeStatus">
<deviceModel></deviceModel>
<devicePIN></devicePIN>
<finalApplicationVersion></finalApplicationVersion>
<finalOSVersion></finalOSVersion>
<lastStatusDate xsi:type="xsd:dateTime">2008-03-
13T10:05:43.686-04:00</lastStatusDate>
<message></message>
<progress></progress>
<requestType></requestType>
<status></status>
<statusDetails></statusDetails>
<upgradeStatDate xsi:type="xsd:dateTime">2008-03-
13T10:05:43.686-04:00</upgradeStatDate>
</DeviceUpgradeStatus>
</deviceStatus>
<finalBuildVersion xsi:type="xsd:string"></finalBuildVersion>
<finalPlatformVersion></finalPlatformVersion>
<initiator xsi:type="xsd:string"></initiator>
<recordsReturned></recordsReturned>
<totalNumberOfRecords></totalNumberOfRecords>
<currentPageNumber xsi:type="xsd:int"><currentPageNumber>
<upgradeDate xsi:type="xsd:dateTime">2008-03-
13T10:05:43.686-04:00</upgradeDate>
</result>
```

In the above response 416, the following element names report on the number of devices in various states: countFailed—Number of devices that failed to upgrade; countInProgress—Number of devices that are currently being upgraded; countInitiated—Number of devices that have received upgrade initiation but have not started upgrading yet; countPending—Number of devices that have not yet received upgrade initiation; countRejected—Number of devices that have rejected upgrade initiation request (rejected by user); countRolledBack—Number of devices that have rolled back the upgrade due to an error while upgrading; and countSuccessfullyCompleted—Number of devices that have successfully completed the upgrade process.

In this illustrative example, the following element names are also defined: deviceModel—Model of the device being reported on; devicePIN—PIN of the device being reported on; finalApplicationVersion—Final application version after a successful upgrade as reported by the device; finalOSVersion—Final OS version after the upgrade; lastStatusDate—Date of the last status message received from device; progress—Upgrade progress indicator (in percent); requestType—Either Initiation Request or Rollback Request; status—Status code sent by the device; statusDetails—Details about the status as reported by the device (if available); upgradeStatDate—Timestamp of the upgrade start as reported by device (actual start date); finalBuildVersion—Final build version for this upgrade; finalPlatformVersion—Final Platform version for this upgrade; initiator—Username of the person that have scheduled the upgrade; upgradeDate—Date when the upgrade was originally scheduled.

In another illustrative example, the carrier provisioning system 414, 424 may request at 418 a roll back of an upgrade that has been carried out. The SOAP request that a third party carrier will submit may contain an XML message of the following general format:

```
<rollbackCriteria xmlns:xsi="http://www.w3.org/2001/XMLSchema-
instance"
  xmlns:soapenc="http://schemas.xmlsoap.org/soap/encoding/"
  xmlns:xsd="http://www.w3.org/2001/XMLSchema"
  xmlns:n1="java:provision.otasl.webservice.imp.model"
  xsi:type="n1:RollbackCriteria">
  <details soapenc:arrayType="n1:RollbackDetails[N]">
  <RollbackDetails xsi:type="n1:RollbackDetails">
    <deviceProperty xsi:type="n1:DeviceProperty">
    <devicePIN></devicePIN>
    <esn></esn>
    <imei></imei>
    <imsi></imsi>
    <meid></meid>
    <msisdn></msisdn>
    </deviceProperty>
    <deviceType></deviceType>
    <message></message>
  </RollbackDetails>
  </details>
  <header xsi:type="n1:Header">
  <requestNumber></requestNumber>
  <user xsi:type="n1:User">
   <login></login>
   <password></password>
  </user>
  </header>
  <upgradeInitiationNumber></upgradeInitiationNumber>
</rollbackCriteria>
```

The rollBackRequest 418 may be used whenever there is a need to revert to the previous version of software on the device prior to the upgrade. Rollback can be done for the entire upgrade request, or for a set of devices including a single device if specified at that level. When initiating a rollback request, at least the upgrade reference number should be provided. When performing a partial rollback (i.e. not all devices in the upgrade), device criteria need to be provided that will uniquely identify the devices needing to be reverted (e.g. by specifying the IMSI of the device that needs to be rolled back).

The following additional element names may be defined for the above rollBackRequest 418: rollbackCriteria—Root tag for requests; RollbackDetails—This tag can be repeated as many times as necessary to roll back N number of devices in one request; message—Optionally, a message can be provided as to the reason why rollback request is requested. This message will be displayed on the device when the subscriber gets rollback request; upgradeInitiationNumber—This is the only mandatory value that needs to be specified when rolling back an upgrade. This indicated which upgrade to roll back; and requestNumber—Unique request number that will identify this request.

In this illustrative embodiment, the supplier provisioning system 334 may respond with a SOAP encoded XML message in the following general format:

```
<result>
    <statusCode></statusCode>
    <statusDescription></statusDescription>
    <upgradeInitiationNumber></upgradeInitiationNumber>
</result>
```

For the above, XML message, the following element names may be defined: statusCode—Return status code for the initiation—for example, a predefined numeral may indicate successes. Any other number may indicate error or warning; statusDescription—Description of the status (Success or error description); upgradeInitiationNumber—This value will be empty for a rollback request, and the same initiation number as for the original upgrade request will be used to reference the rollback.

Figure 5:
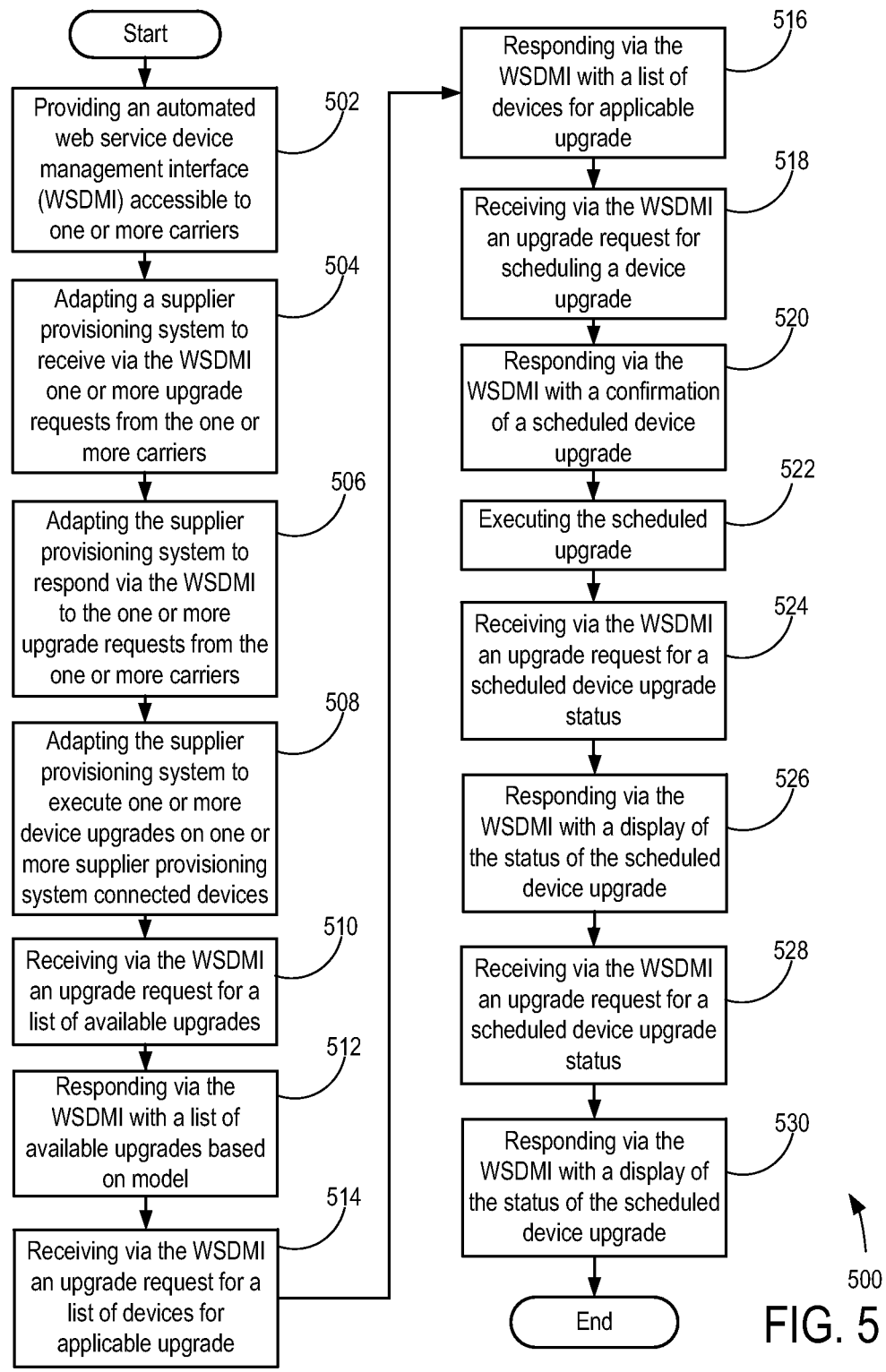
FIG. 5 is a schematic flowchart of a method in accordance with various embodiments.

Now referring to FIG. 5, shown is a schematic flowchart of a method 500 in accordance with an embodiment. As shown, method 500 begins at block 502, where method 500 provides an automated web service device management interface ("WSDMI") accessible to one or more carriers. Method 500 proceeds to block 504, where method 500 adapts a supplier provisioning system to receive via the WSDMI one or more upgrade requests from the one or more carriers.

Method 500 then proceeds to block 506, where method 500 adapts the supplier provisioning system to respond via the WSDMI to the one or more upgrade requests from the one or more carriers.

Method 500 then proceeds to block 508, where method 500 adapts the supplier provisioning system to adapting the supplier provisioning system to execute one or more device upgrades on one or more supplier provisioning system connected devices.

Method 500 then proceeds to block 510, where method 500 receives via the WSDMI an upgrade request for a list of available upgrades. Method 500 then proceeds to block 512, where method 500 responds via the WSDMI with a list of available upgrades based on device model.

Method 500 then proceeds to block 514, where method 500 receives via the WSDMI an upgrade request for a list of devices for applicable upgrade. Method 500 then proceeds to block 516, where method 500 responds via the WSDMI with a list of devices for applicable upgrade.

Method 500 then proceeds to block 518, where method 500 receives via the WSDMI an upgrade request for scheduling a device upgrade. Method 500 then proceeds to block 520, where method 500 responds via the WSDMI with a confirmation of a scheduled device upgrade. Method 500 then proceeds to block 522 to execute the scheduled device upgrade.

Method 500 then proceeds to block 524, where method 500 receives via the WSDMI an upgrade request for a scheduled device upgrade status. Method 500 proceeds to block 526, where method 500 responds via the WSDMI with a display of the status of the scheduled device upgrade.

Method 500 then proceeds to block 528, where method 500 receives via the WSDMI an upgrade request to fully or partially rollback a scheduled device upgrade. Method 500 then proceeds to block 530, where method 500 responds via the WSDMI with a confirmation of the full or partial rollback of the scheduled upgrade request.

Thus, in an aspect, there is provided a method for provisioning mobile communication device upgrades, comprising: providing an automated web service device management interface ("WSDMI") accessible to one or more carriers; adapting a supplier provisioning system to receive via the WSDMI one or more upgrade requests from the one or more carriers; adapting the supplier provisioning system to respond via the WSDMI to the one or more upgrade requests from the one or more carriers; and adapting the supplier provisioning system to execute one or more device upgrades on one or more supplier provisioning system connected devices.

In an embodiment, the method further comprises: receiving via the WSDMI an upgrade request for a list of available upgrades; and responding via the WSDMI with a list of available upgrades based on device model.

In another embodiment, the method further comprises: receiving via the WSDMI an upgrade request for a list of devices for applicable upgrade; and responding via the WSDMI with a list of devices for applicable upgrade.

In an embodiment, the method further comprises: receiving via the WSDMI an upgrade request for scheduling a device upgrade; responding via the WSDMI with a confirmation of a scheduled device upgrade; and executing the scheduled device upgrade.

In an embodiment, the method further comprises: receiving via the WSDMI an upgrade request for a scheduled device upgrade status; and responding via the WSDMI with a display of the status of the scheduled device upgrade.

In an embodiment, the method further comprises: receiving via the WSDMI an upgrade request to fully or partially rollback the scheduled device upgrade; and responding via the WSDMI with a confirmation of the full or partial rollback of the scheduled upgrade request.

In an embodiment, the receiving and responding via the WSDMI is based on SOAP encoded XML messages.

In another aspect, there is provided a system for provisioning mobile communication device upgrades, the system comprising: means for receiving via an automated web service device management interface ("WSDMI") accessible to one or more carriers one or more upgrade requests; means for responding via the WSDMI to the one or more upgrade requests from the one or more carriers; and means for executing one or more device upgrades on one or more supplier provisioning system connected devices.

In an embodiment, the system further comprises: means for receiving via the WSDMI an upgrade request for a list of available upgrades; and means for responding via the WSDMI with a list of available upgrades based on device model.

In another embodiment, the system further comprises: means for receiving via the WSDMI an upgrade request for a list of devices for applicable upgrade; and means for responding via the WSDMI with a list of devices for applicable upgrade.

In another embodiment, the system further comprises: means for receiving via the WSDMI an upgrade request for scheduling a device upgrade; means for responding via the WSDMI with a confirmation of a scheduled device upgrade; and means for executing the scheduled device upgrade.

In another embodiment, the system further comprises: means for receiving via the WSDMI an upgrade request for a scheduled device upgrade status; and means for responding via the WSDMI with a display of the status of the scheduled device upgrade.

In another embodiment, the system further comprises: means for receiving via the WSDMI an upgrade request to fully or partially rollback the scheduled device upgrade; and means for responding via the WSDMI with a confirmation of the full or partial rollback of the scheduled upgrade request.

In another embodiment, the means for receiving and means for responding via the WSDMI is based on SOAP encoded XML messages.

In another aspect, there is provided a data processor readable medium storing data processor code that when loaded into a supplier provisioning system adapts the system to provide provisioning of mobile communication device upgrades, the data processor readable medium comprising: code providing an automated web service device management interface ("WSDMI") accessible to one or more carriers; code for adapting the supplier provisioning system to receive via the WSDMI one or more upgrade requests from the one or more carriers; code for adapting the supplier provisioning system to respond via the WSDMI to the one or more upgrade requests from the one or more carriers; and code for adapting the supplier provisioning system to execute one or more device upgrades on one or more supplier provisioning system connected devices.

In an embodiment, the data processor readable medium further comprises: code for receiving via the WSDMI an upgrade request for a list of available upgrades; and code responding via the WSDMI with a list of available upgrades based on device model.

In another embodiment, the data processor readable medium further comprises: code for receiving via the WSDMI an upgrade request for a list of devices for applicable upgrade; and code for responding via the WSDMI with a list of devices for applicable upgrade.

In an embodiment, the data processor readable medium further comprises: code for receiving via the WSDMI an upgrade request for scheduling a device upgrade; code for responding via the WSDMI with a confirmation of a scheduled device upgrade; and code for executing the scheduled device upgrade.

In an embodiment, the data processor readable medium further comprises: code for receiving via the WSDMI an upgrade request for a scheduled device upgrade status; and code for responding via the WSDMI with a display of the status of the scheduled device upgrade.

In an embodiment, the data processor readable medium further comprises: code for receiving via the WSDMI an upgrade request to fully or partially rollback the scheduled device upgrade; and code for responding via the WSDMI with a confirmation of the full or partial rollback of the scheduled upgrade request.

In an embodiment, the code for receiving and code for responding via the WSDMI is based on SOAP encoded XML messages.

While illustrative embodiments have been described above, it will be appreciated that various changes and modifications may be made. More generally, the scope of the invention is defined by the following claims.

What is claimed is:

1. A method for provisioning mobile communication device upgrades, comprising:
   providing an automated web service device management interface ("WSDMI") accessible to a plurality of carriers;
   receiving, at a supplier provisioning system via the WSDMI, upgrade requests from the plurality of carriers, the upgrade requests comprising at least one upgrade request for scheduling a scheduled device upgrade and at least one rollback request for fully or partially rolling back a previous scheduled device upgrade;
   responding to the upgrade requests from the plurality of carriers via the WSDMI with a list of available upgrades based on a device model, the responding comprising providing a confirmation of the scheduled device upgrade and a confirmation of a full or partial rollback of the previous scheduled device upgrade;
   receiving, via the WSDMI, an upgrade request for a list of devices for the device upgrades; and
   executing the device upgrades on one or more devices, the devices connected to the supplier provisioning system.

2. The method of claim 1,
   wherein at least one of the upgrade requests is for a list of available upgrades based on the device model.

3. The method of claim 1,
   wherein at least one of the upgrade requests is for a list of devices for an applicable upgrade, and
   wherein responding comprises responding with the list of devices for the applicable upgrade.

4. The method of claim 1,
   wherein at least one of the upgrade requests comprises a status request for a scheduled device upgrade status, and
   wherein responding comprises responding to the status request with a display of the status of a scheduled device upgrade.

5. The method of claim 1, wherein receiving and responding comprises receiving and responding via the WSDMI is based on SOAP encoded XML messages.

6. The method of claim 1, wherein the supplier provisioning system is maintained by a supplier.

7. A system for provisioning mobile communication device upgrades, the system comprising:
   means for receiving, at a supplier provisioning system via an automated web service device management interface ("WSDMI"), upgrade requests from a plurality of carriers, including receiving at least one upgrade request for scheduling a scheduled device upgrade and at least one rollback request for fully or partially rolling back a previous scheduled device upgrade;
   means for responding to the upgrade requests from the plurality of carriers via the WSDMI with a list of available upgrades based on a device model, including providing a confirmation of the scheduled device upgrade and a confirmation of a full or partial rollback of the previous scheduled device upgrade;
   means for receiving, via the WSDMI, an upgrade request for a list of devices for the device upgrades; and
   means for executing the device upgrades on one or more devices, the devices connected to the supplier provisioning system.

8. The system of claim 7,
   wherein at least one of the upgrade requests is for a list of available upgrades based on the device model.

9. The system of claim 7,
   wherein at least one of the upgrade requests is for a list of devices for applicable upgrade, and
   wherein the means for responding comprise means for responding with the list of devices for applicable upgrade.

10. The system of claim 7,
    wherein at least one of the upgrade requests comprises a status request for a scheduled device upgrade status, and
    wherein the means for responding comprise means for responding to the status request with a display of the status of the scheduled device upgrade.

11. The system of claim 7, wherein the means for receiving and the means for responding comprise means for receiving and means for responding via the WSDMI based on SOAP encoded XML messages.

12. The system of claim 7, wherein the supplier provisioning system is maintained by a supplier.

13. A non-transitory data processor readable medium storing data processor code that when loaded into a supplier provisioning system, directs the system to provide provisioning of mobile communication device upgrades, the data processor readable medium comprising:
- code for providing an automated web service device management interface ("WSDMI") accessible to a plurality of carriers;
- code for receiving, at the supplier provisioning system via the WSDMI, upgrade requests from the plurality of carriers, including receiving at least one upgrade request for scheduling a scheduled device upgrade and at least one rollback request for fully or partially rolling back a previous scheduled device upgrade;
- code for responding to the upgrade requests from the plurality of carriers via the WSDMI with a list of available upgrades based on a device model, including providing a confirmation of the scheduled device upgrade and a confirmation of a full or partial rollback of the previous scheduled device upgrade;
- receiving, via the WSDMI, an upgrade request for a list of devices for the device upgrades; and
- code for executing the device upgrades on one or more devices, the devices connected to the supplier provisioning system.

14. The non-transitory data processor readable medium of claim 13,
- wherein at least one of the upgrade requests is for a list of available upgrades based on the device model.

15. The non-transitory data processor readable medium of claim 13,
- wherein at least one of the upgrade requests is for a list of devices for applicable upgrade, and
- wherein the code for responding comprises code for responding with the list of devices for applicable upgrade.

16. The non-transitory data processor readable medium of claim 13,
- wherein at least one of the upgrade requests comprises a status request for a scheduled device upgrade status, and
- wherein the code for responding comprises code for responding to the status request with a display of the status of the scheduled device upgrade.

17. The non-transitory data processor readable medium of claim 13, wherein the code for receiving and the code for responding comprise code for receiving and code for responding via the WSDMI based on SOAP encoded XML messages.

18. The non-transitory data processor readable medium of claim 13, wherein the supplier provisioning system is maintained by a supplier.

* * * * *